(12) United States Patent
Oshima et al.

(10) Patent No.: US 7,286,270 B2
(45) Date of Patent: Oct. 23, 2007

(54) OPTICAL READING DOCUMENT BOARD AND OPTICAL READER

(75) Inventors: Yoshihiro Oshima, Gifu (JP); Hideaki Tomotsu, Gifu (JP)

(73) Assignee: Sony Corporation (JP)

( * ) Notice: Subject to any disclaimer, the term of this patent is extended or adjusted under 35 U.S.C. 154(b) by 831 days.

(21) Appl. No.: 10/313,155

(22) Filed: Dec. 6, 2002

(65) Prior Publication Data

US 2003/0142375 A1     Jul. 31, 2003

(30) Foreign Application Priority Data

Dec. 12, 2001    (JP)    ............................ P2001-379148

(51) Int. Cl.
*H04N 1/04*    (2006.01)

(52) U.S. Cl. ............. 358/474; 358/487; 358/509; 358/1.9; 358/475; 358/461; 348/207.99; 348/569; 359/211

(58) Field of Classification Search ............... 358/474, 358/487, 475, 509, 486, 506, 400; 359/453, 359/455, 457, 368
See application file for complete search history.

(56) References Cited

U.S. PATENT DOCUMENTS

| 3,889,272 | A | * | 6/1975 | Lou et al. | .................... 430/346 |
| 5,430,484 | A | * | 7/1995 | Nagane et al. | .............. 348/370 |
| 5,459,353 | A | * | 10/1995 | Kanazawa | ................... 257/751 |
| 5,712,194 | A | * | 1/1998 | Kanazawa | ................... 438/618 |
| 6,284,382 | B1 | * | 9/2001 | Ishikawa et al. | ............ 428/428 |
| 6,383,859 | B2 | * | 5/2002 | Watanabe | ................... 438/239 |

* cited by examiner

*Primary Examiner*—Aung S. Moe
*Assistant Examiner*—Negussie Worku
(74) *Attorney, Agent, or Firm*—Lerner, David, Littenberg, Krumholz & Mentlik, LLP

(57) ABSTRACT

In an optical-reading document board, an anti-reflection layer is formed by a transparent film and an anti-reflection film is bonded on a document-resting surface of a transparent glass plate. The anti-reflection layer is structured by a transparent film and an anti-reflection film bonded on one surface of the transparent film. The use of such an anti-reflection film greatly improves reflectivity to provide an averaged reflectivity of approximately 3% in the entirety. As a result, the transmissivity of light is 94% or greater. In connection with this, the conventional layer has a reflectivity of approximately 8%, and a transmissivity thereof is around 90%. This makes it possible to effectively utilize more of the light from the light source and thus greatly improve contrast.

15 Claims, 4 Drawing Sheets

OPTICAL READING DOCUMENT BOARD AND OPTICAL READER

FIELD OF THE INVENTION

This invention relates to an optical-reading document board and optical reader suitably applicable to a copier or the like. More particularly, by bonding an anti-reflection film structured by a transparent film and anti-reflection film onto a surface of a document-board glass plate, optical reading is realized that is easy to manufacture and excellent in anti-reflection effect.

DESCRIPTION OF THE RELATED ART

The scanners of copiers, FAXes and OCRs, in any, are arranged to optically read information out of a document being rested upon a transparent document board.

For example, in a flat type of copier, a document sheet for copy is placed on a document board made by a transparent glass plate. Light is radiated onto the document board to read a differential in reflectivity from the document board, thereby obtaining document information (electric signal).

In the case of radiating light to the glass plate, light loss occurs due to the reflection of light upon a light incident surface (referred to as a backside) and document-resting surface (referred to as a surface). It is considered that, the light incident on the backside of the document board usually has a light portion of 8% not reaching a document surface due to reflection. Likewise, the light reached the document surface has a light portion of 8% no returning due to the reflection upon the surface of the document board.

In many cases, an electrification preventing film, as a countermeasure to static electricity, is bonded over the surface of the document board. Where such an electrification preventing film exists, light reflection is also caused by the electrification preventing film. It is considered that light loss of approximately 14% is caused.

There is a disclosure, e.g. in JP-A-2001-5881 (hereinafter, referred to as the prior art), on one means to solve the problem encountered in such an optical reader. The prior art concerns a technique to directly form an anti-reflection film on a glass surface for a document board.

In case an anti-reflection film is provided on the glass surface, there is an improvement in the light reflectivity upon the respective surfaces of the document board (glass plate) as compared to the case without the provision of an anti-reflection film.

This prior art, however, has the following defects because of deposition of an anti-reflection film by sputtering.

(1) The deposition apparatus increases in scale to raise the set-up cost.

(2) Because of sputtering deposition, batch processing is required to form a film on each of glass surfaces, raising deposition cost per sheet.

(3) In a scheme to read document information while feeding document sheets through utilization of a document auto-feeder, friction takes place between the fed document sheet and the anti-reflection film (anti-reflection surface). By such friction, the anti-reflection film is liable to be stripped off. If the film is stripped off, it is impossible to repair the anti-reflection film, i.e. entirety of the glass plate must be exchanged.

(4) With a document sheet using a solid ink, the document sheet has an increased frictional force. The document sheet adheres to the glass surface or document board. This makes it difficult to eject the copied document sheet by the utilization of the auto-feeder mechanism.

OBJECTS AND SUMMARY OF THE INVENTION

This invention solves the foregoing conventional problems, and proposes an optically-reading document board capable of improving the reflectivity of light by bonding particularly an anti-reflection film on a surface of a document board, without raising manufacture cost and an optical reader using the same.

In order to solve the above problem, an optical-reading document board according to the present invention comprises an anti-reflection film formed by a transparent film and an anti-reflection film which is bonded on a document-resting surface of a transparent glass plate.

An optical reader according to the invention comprises:

an optical-reading document board bonded, on a document-resting surface, with an anti-reflection film formed by a transparent film and an anti-reflection film;

a light source part, for scanning parallel with the optical-reading document board, provided beneath the optical-reading document board; and a light-receiving part for receiving a light signal from the light source part and converting the light signal into an electric signal.

In this invention, an anti-reflection film is bonded at least on a document-resting surface of a transparent plate (e.g. a glass plate) structuring a document board, preferably on the both surfaces thereof.

The anti-reflection film is structured by a transparent film and an anti-reflection film bonded on one surface of the transparent film. The anti-reflection film is bonded, at a surface, with a water-repellent coat as required. The anti-reflection film is applied, at the other surface, with an adhesive. The anti-reflection film uses a layered film having alternate layers of first and second layers different in refractive index. The one having an electrification preventing property can be used on the document-resting surface.

The use of such an anti-reflection film greatly improves reflectivity to provide an averaged reflectivity of approximately 3% in the entirety. As a result, the transmissivity of light is 94% or greater. In connection with this, the conventional has a reflectivity of approximately 8%, and a transmissivity thereof is at around 90%. This makes it possible to effectively utilize the light from the light source, thus greatly improving contrast.

Meanwhile, because the anti-reflection film is merely bonded on a glass surface, the set up for bonding is small in scale and bonding operation is simple. Also, because sheet-fed process is possible to bond anti-reflection films on a plurality of glass surfaces, the manufacture cost per sheet is quite inexpensive.

A water-repellent coat can be provided, as required, on a surface of the anti-reflection film of the document-resting surface. The anti-reflection film on the side opposite to the document-resting surface may not have an electrification preventing property.

DETAILED DESCRIPTION OF A PREFERRED EMBODIMENT

An optical-reading document board and optical reader, in one embodiment, according to the present invention will be explained in detail with reference to the drawings.

Figure 1:
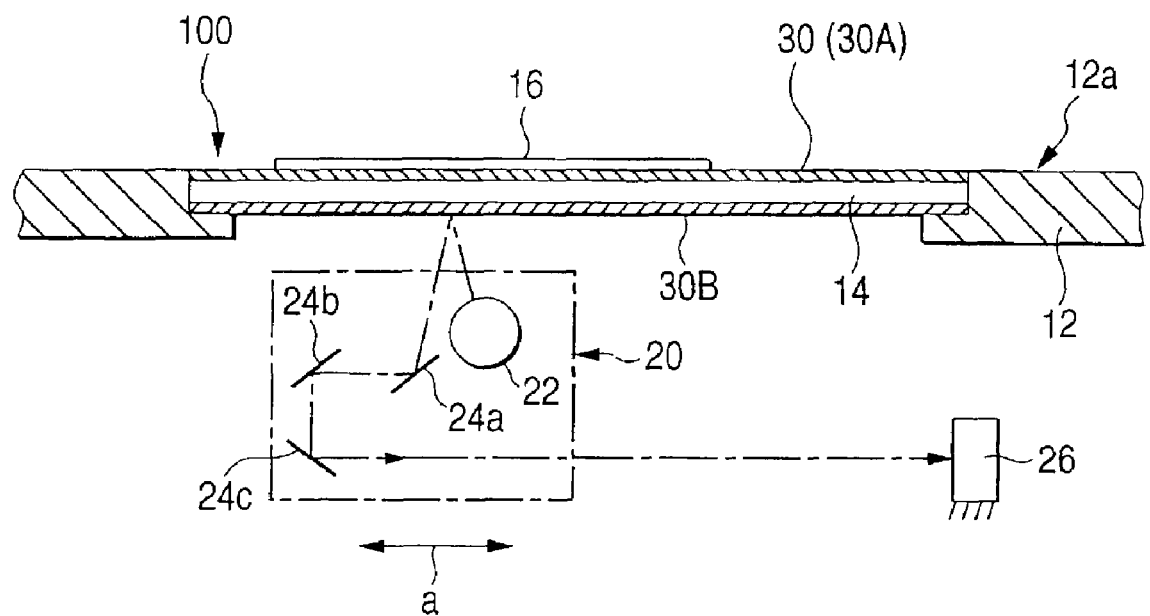
FIG. 1 shows an embodiment that an optical reader according to the invention is applied to a copier.

A copier 10 shown in FIG. 1 has a document board 14 mounted and fixed on a top surface 12a of an apparatus body 12 thereof. The document board 14 uses a transparent glass plate or the like so that a document sheet 16 can be rested on an upper surface thereof.

On a back side of the document board 14 (opposite surface to the document-resting surface), an optical scan part 20, functioning as a light-source part; is provided to slide parallel with the document board 14 and optically scan over the document 16. The optical scan part 20 is constructed with a light source 22, such as a halogen lamp, and a plurality of reflection mirrors 24a, 24b, 24c to guide a reflection light from the light source 22. The light upon the reflection mirror 24c is guided to a light-receiving part 26 where it is converted into a reception-light signal (electric signal). The light receiving part 26 uses a line sensor using a CCD, or the like.

In the invention, an anti-reflection film 30 (30A) is bonded at least on the document-resting surface of the document board 14. The embodiment of FIG. 1 shows a case where anti-reflection films 30A, 30B are bonded on the both surfaces of the document board 14. Explanation is made, at first, on the first anti-reflection film 30A with reference to FIG. 2.

Figure 2:
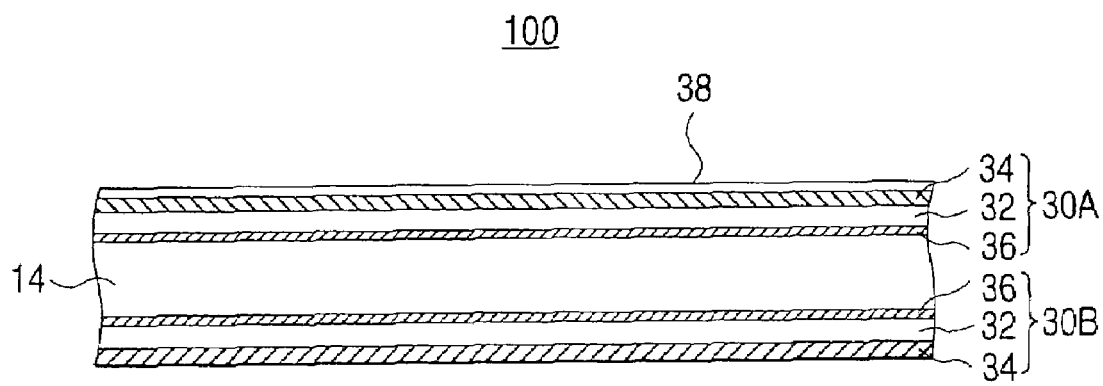
FIG. 2 is a sectional view showing an embodiment of an optical-reading document board of the invention.

FIG. 2 shows an embodiment of optical-reading document board 100 of the invention. This is constructed with a document board 14 and an anti-reflection film 30 bonded on the document board 14, as mentioned before.

FIG. 2 is on a case that a first anti-reflection film 30A is bonded on one surface (document-resting surface) of the document board 14 while a second anti-reflection film 30B is on the other surface thereof. The first anti-reflection film 30A is structured by a transparent film 32, an anti-reflection film 34 bonded on one surface of the transparent film 32 and an adhesive layer 36 applied on the other surface.

The transparent film 32 can use polyethylene terephthalate (PET) having a thickness of approximately 150-200 μm, or the like.

The anti-reflection film 34 bonded on the surface of the transparent film 32 uses a layered film having alternating layers of a first layer 34a using a material with a low refractive index and a second layer 34b using a material with a higher refractive index than that of the first layer, to provide a reduced refractive index.

The low refractive index (first refractive index) of the first layer 34a is preferably a refractive index of at around 1.5. For a material having such a refractive index, an oxide film, e.g. $SiO_2$, is generally suited from a point of view of easiness in manufacture and stability after manufacture. As hereinafter referred, in the case of forming an anti-reflection film by evaporation in place of sputtering, MgF (having a refractive index of approximately 1.3) can be used in place of an oxide film.

The high refractive index of the second layer 34b is preferably at around 2.0. The materials having such a refractive index includes niobium oxide, titanium oxide and tantalum oxide. This embodiment uses a transparent conductive film (ITO) because conductivity is provided to the second layer 34b. The use of a transparent conductive film prevents a document sheet or the like from adhering to the anti-reflection film 34 itself. Namely, electrification-preventing property can be provided.

The transparent conductive film 34b in this embodiment utilizes, as a material, indium oxide added with tin oxide in an amount of nearly 10%. Its refractive index is approximately 1.7-2.5.

Figure 3:
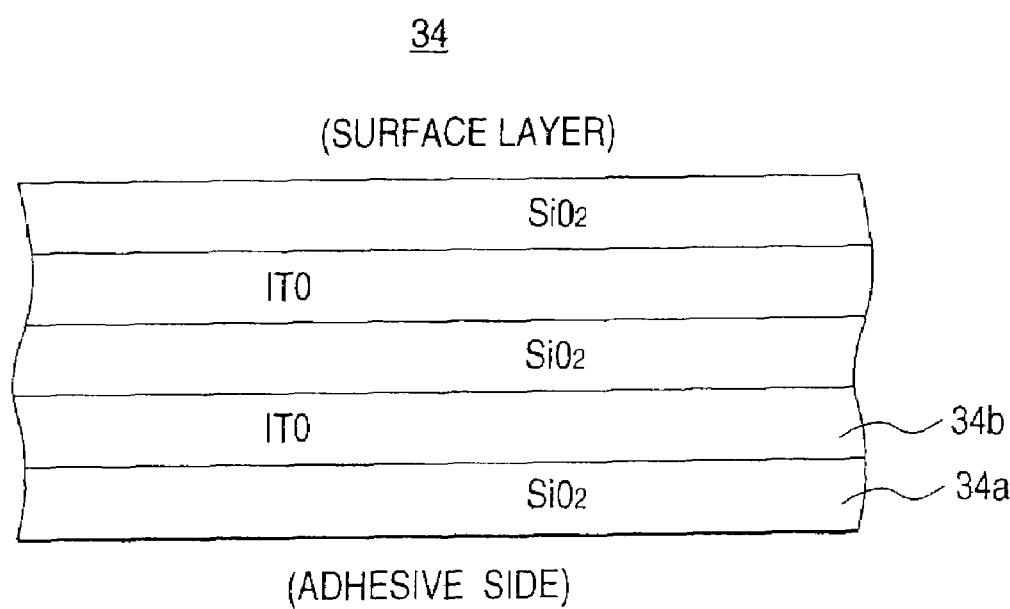
FIG. 3 is a sectional view showing a structural example of an anti-reflection film to be applied to the invention.

This embodiment exemplifies an anti-reflection film 34 having a five-layer structure, as shown in FIG. 3. The total thickness, in such a case, is designed to a possible small thickness. In the embodiment, the respective ones of layer thickness are selected to approximately 1000-2000 angstroms in total.

The order of layering is selected such that the surface layer is of the first layer 34a, i.e. oxide film. In the case of a five-layer structure, the first layer 34a comprises three layers while the second layer 34b has two layers. In order to overlay these alternately, sputtering is suitably applied. An anti-reflection film 30A is formed by depositing films in a sequential order.

Note that this embodiment shows a case, as shown in FIG. 3, that a water-repellent coat 38 is further coated on a surface of the anti-reflection film 34A. This water-repellent coat 38 is provided by coating fluoric resin (e.g. perfluoropolyether) to a thickness of 30-50 angstrom.

In the case of depositing an anti-reflection film 34 mentioned above on the transparent film 32 by sputtering, the producibility is high because forming is possible over 1000 square meters per day.

On the other surface of the transparent film 32, a transparent adhesive 36 is applied to a predetermined thickness. A pressure-sensitive acrylic adhesive can be used as the adhesive 36.

Using the adhesive 36, the first anti-reflection film 34A is bonded onto the document-resting surface of the document board 14. A method to bond an anti-reflection film on a surface of a cathode ray tube can be applied as the method for bonding.

On also the backside of the document board 14, the second anti-reflection film 30B is bonded as shown in FIG. 2. The second anti-reflection film 30B is also structured with a transparent film 32 and an anti-reflection film 34. A layered film having a five-layer structure shown in FIG. 3 can be used as the anti-reflection film 34. Accordingly, in this example, the anti-reflection film has electrification preventing property. It is noted that a water-repellent coat is not required.

Figure 4:
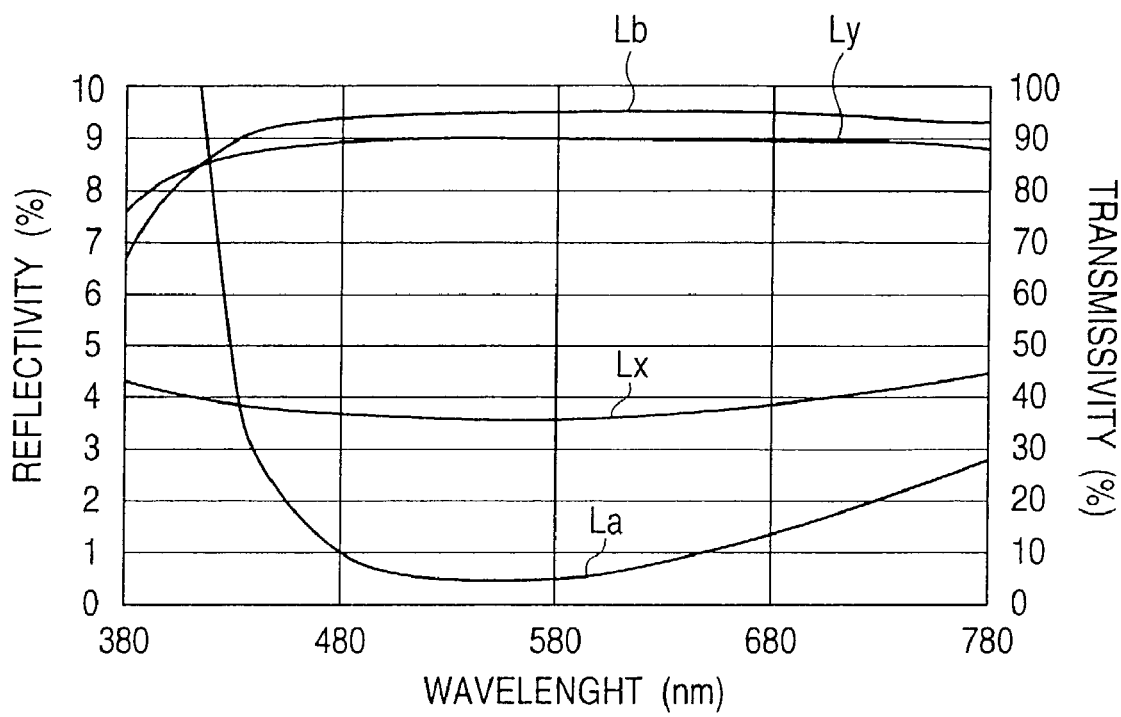
FIG. 4 is a characteristic diagram showing a reflectivity and a transmissivity upon and through the document board including the anti-reflection sheet.

Explanation is now made on a relationship between a reflectivity and a transmissivity of light upon and through the document board 14 having the first and second anti-reflection films 30A, 30B thus configured, with reference to FIG. 4. FIG. 4 shows a characteristic curve of one layer of film in a state coated with a water-repellent coat 38.

The curve La in FIG. 4 represents a light reflectivity. As apparent from the curve La, the reflectivity has an average value of nearly 1.5% in the region of visible light. Accordingly, because the reflectivity when the anti-reflection films 30A, 30B are bonded on the both surfaces of the document board 14 can be suppressed to nearly 3%, the light transmissivity in the visible light region is 94-95% as seen on the curve Lb. This makes it possible to utilize, for reading documents, almost all the light from the light source 22. This can be considered because of the reason that the anti-reflection film has been formed by the use of a material having a high refractive index and the overall thickness of the film has been decreased.

In the conventional, the reflectivity is as given by the curve Lx with an average of approximately 4%. Consequently, in case an anti-reflection film is formed on the both surfaces of the document board, the transmissivity thereof is reduced to around 90% as seen on the curve Ly. Because conventionally this is bonded with an electrification preventing film, the transmissivity of the same is further lowered as on the curve Lz. In this invention, however, because the anti-reflection film 30 itself possesses an electrification preventing property, film bonding leading to light loss can be reduced to a maximum.

By reducing the reflectivity, contrast is improved on the optical signal. When reading is performed out of a white document sheet, a white sheet is to be outputted. In the conventional case, output is a sheet gray-colored a little.

The use of an anti-reflection film 30 given with an electrification preventing property can prevent a document sheet 16 from adhering to the document board 14 due to static electricity caused with the document sheet 16. This, accordingly, reduces the friction with the document sheet 16.

Furthermore, in the case of coating a water-repellent coat 38, the adhesion of the document sheet 16 is relieved furthermore. For example, even where using a document sheet using a solid ink, it can be prevented from adhering to the document board 14. Accordingly, in case the optical reading document board 10 of the invention is set up on a copier having a document auto-feeder, for example, it is possible to avoid paper jamming resulting from adhesion of a document sheet.

Naturally, the frictional reduction with a document sheet eliminates the application of excessive stress to the anti-friction film 30A. This contributes to an improvement in the resistance to stripping-off of the anti-reflection film 30A. Should the anti-reflection film 30A is stripped off in the long-term use, a new anti-reflection film A may be bonded onto the document-resting surface of the document board 14. The operation is to be satisfactorily carried out while paying an attention not to entrap air bubbles. Thus, the bonding operation is easy to be carried out.

Figure 5:
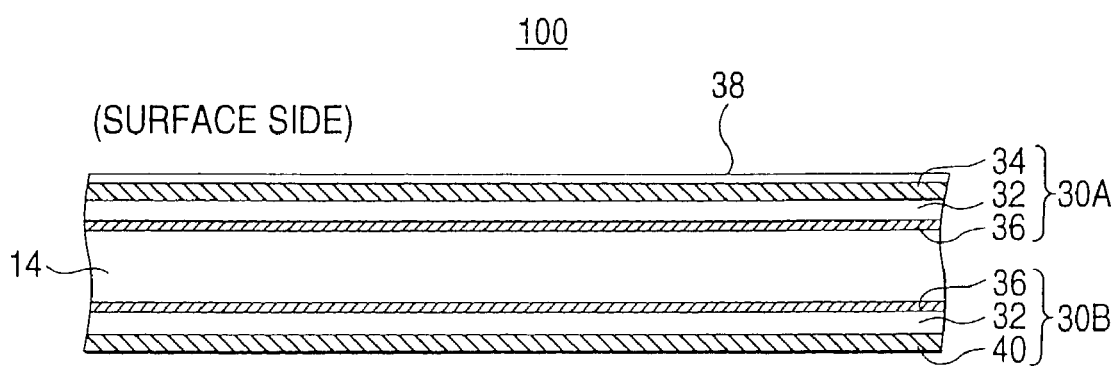
FIG. 5 is a sectional view showing another embodiment of an optical-reading document board of the invention.

In the above embodiment, the anti-reflection film 30B bonded on the backside of the document board 14 was in the same structure as the anti-reflection film 30A bonded on the document-resting surface. FIG. 5 shows a case of using a different anti-reflection film 40 as an anti-reflection film 30B.

Figure 6:
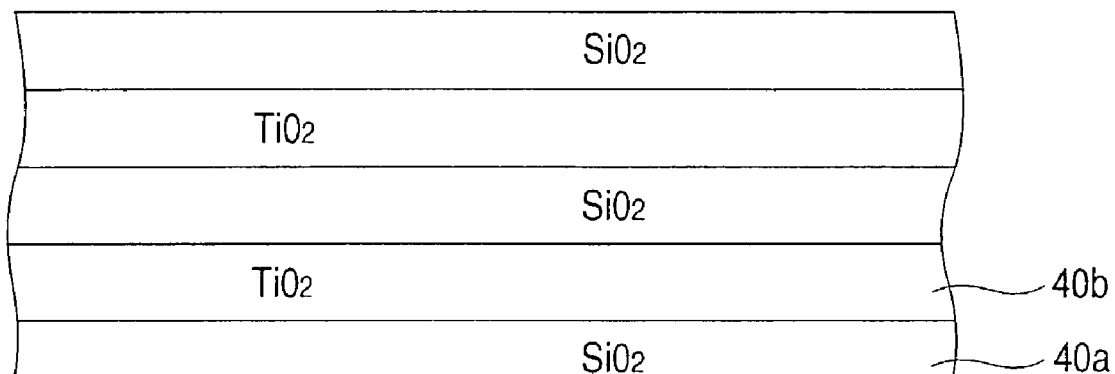
FIG. 6 is a sectional view showing another structural example of an anti-reflection film to be applied to the invention.

Namely, because the anti-reflection film 30B is to be bonded on the backside of the document board 14, there is no need to provide especially the anti-reflection film with an electrification preventing property. For this reason, in this embodiment, as an anti-reflection film 40 for use as a second anti-reflection film 30B, a non-conductive transparent film 40b is used in place of a transparent conductive film, as shown in FIG. 6. As the transparent film 40b, titanium oxide (TiO$_2$) having a high refractive index or the like is used, as noted before. The other structures are the same as those of FIG. 3 and hence the explanation thereof is omitted. In this case, there is, naturally, no need of providing a water-repellent coat.

Meanwhile, in the embodiment shown in FIG. 1, the anti-reflection films 30 are bonded on the both surfaces of the document board 14. In the invention, it is satisfactory if an anti-reflection film 30 is bonded at least on the document-resting surface of the document board 14. This is because the anti-reflection film has a reflectivity as low as 1.5% even on the document-resting surface so that, even with bonding at one surface, the reflectivity can be made lower than that of the conventional to improve light transmissivity.

In the above embodiment, the optical-reading document board of the invention was applied to the document board provided on the copier while the optical reader was applied to the copier. However, the invention can be applied for an optical-reading document board or optical reader, that is, a scanner such as of a FAX, OCR to optically read document.

As explained above, in the invention, an optical-reading document board is configured by bonding an anti-reflection film structured with a transparent film and an anti-reflection film at least on a document-resting surface or on both surfaces of the document board, and an optical reader is configured by using such a document board.

Because this improves the reflectivity of an anti-reflection film, the light transmissivity is increased to effectively make use of the light for document reading from a light source. As a result, contrast is improved in the still image obtained by optical scanning.

Because the anti-reflection film is given with an electrification preventing property, this relieves adhesion of a document sheet to the document board. In conjunction with a water-repellent coat, the document sheet is reduced in friction with the document board. As a result, paper jamming is prevented even where a document auto-feeder is provided and a document using a solid ink is used.

Because the anti-reflection film is merely bonded on a glass surface of the document board, there is no need to use a sputtering apparatus as required in the conventional. It is possible to carry out a sheet-fed process for processing a multiplicity of anti-reflection films at the same time, thus reducing the manufacture cost. Because the anti-reflection film, even when stripped off, can be easily replaced, there is a feature to reduce the reproduction cost (repair cost).

Of course, in the event an impact is caused to the document board by mistake, the anti-reflection film exhibits an effect of preventing glass fragments from scattering thus being excellent in safety.

Accordingly, the invention is suitably applicable to an optical reading system including a copier, a FAX and a scanner.

What is claimed is:

1. An optical-reading document board having a document-resting surface operable to have a document placed thereon, said board comprising a transparent glass plate and an anti-reflection layer, said anti-reflection layer being formed by a transparent film and an anti-reflection film and being bonded on a surface of the transparent glass plate so as to form the document-resting surface, wherein the anti-reflection layer is a multi-layer film having an electrification preventing property, and wherein the anti-reflection layer is structured as a layered film having alternate layers of a first layer having a first refractive index and a second layer having a second refractive index greater than the first refractive index.

2. The optical-reading document board according to claim 1, wherein the first layer is an oxide film and the second layer is a transparent conductive film, the anti-reflection layer having a surface layer as the first layer.

3. An optical reader comprising:
an optical-reading document board having a document-resting surface operable to have a document placed thereon, said board having a transparent glass plate and an anti-reflection layer, said anti-reflection layer being formed by a transparent film and an anti-reflection film and being bonded on a surface of the transparent glass plate so as to form the document-resting surface;
a light source provided beneath the optical-reading document board to carry out scanning parallel with the optical-reading document board; and
a light-receiving part for receiving a light beam from the light source and converting the light beam into an electric signal,
wherein the anti-reflection layer is a multi-layer film having an electrification preventing property, and
wherein the anti-reflection layer is structured by a layered film having alternate layers of a first layer having a first refractive index and a second layer having a second refractive index greater than the first refractive index.

4. The optical reader according to claim 3, wherein the first layer is an oxide film and the second layer is a transparent conductive film, the anti-reflection film having a surface layer as the first layer.

5. An optical-reading document board having a document-resting surface operable to have a document placed thereon, said board comprising:
a transparent glass plate;
a first anti-reflection layer formed by a first transparent film and a first anti-reflection film and bonded on a first surface of the transparent glass plate so as to form the document-resting surface; and
a second anti-reflection layer formed by a second transparent film and a second anti-reflection film and bonded on a second surface of the transparent glass plate which is opposite to the first surface.

6. The optical-reading document board according to claim 5, wherein the anti-reflection film structuring the first anti-reflection layer is a multi-layer film having an electrification preventing property.

7. The optical-reading document board according to claim 6, wherein the anti-reflection film in the first and second anti-reflection layers is structured by a layered film having alternate layers of a first layer having a first refractive index and a second layer having a second refractive index greater than the first refractive index.

8. The optical-reading document board according to claim 7, wherein the first layer structuring the anti-reflection film of the first anti-reflection layer is an oxide film and the second layer is a transparent conductive film, the anti-reflection film having a surface layer as the first layer.

9. The optical-reading document board according to claim 7, wherein the first anti-reflection film structuring the anti-reflection film of the second anti-reflection layer is an oxide film and the second layer is a transparent film or transparent conductive film not having electrical conductivity.

10. The optical-reading document board according to claim 5, wherein the first anti-reflection layer is coated on a surface, with a water-repellent coat.

11. An optical reader comprising:
an optical-reading document board having a document-resting surface operable to have a document placed thereon, said board having a transparent glass plate, a first anti-reflection layer, and a second anti-reflection layer, the first anti-reflection layer formed by a first transparent film and a first anti-reflection film and bonded on a first surface of the transparent glass plate so as to form the document-resting surface, and the second anti-reflection layer formed by a second transparent film and a second anti-reflection film and bonded on a second surface of the transparent glass plate which is opposite to the first surface;
a light source provided beneath the optical-reading document board to carry out scanning parallel with the optical-reading document board; and
a light-receiving part for receiving a light beam from the light source part and converting the light beam into an electric signal.

12. The optical reader according to claim 11, wherein the anti-reflection film structuring at least the first anti-reflection layer is a multi-layer film having an electrification preventing property.

13. The optical reader according to claim 11, wherein the anti-reflection film is structured by a layered film having alternate layers of a first layer having a first refractive index and a second layer having a second refractive index greater than the first refractive index.

14. The optical reader according to claim 13, wherein the first layer structuring the anti-reflection film of the first anti-reflection layer is an oxide film and the second layer is a transparent conductive film,
the first layer structuring the anti-reflection film of the second anti-reflection layer being an oxide film and the second layer being a transparent conductive film or a transparent film not having conductivity, the anti-reflection film having a surface layer as the first layer.

15. The optical reader according to claim 11, wherein the first anti-reflection layer is coated on a surface with a water-repellent coat.

* * * * *